United States Patent [19]

Blount

[11] Patent Number: 5,409,154

[45] Date of Patent: Apr. 25, 1995

[54] SUPPORT DEVICE FOR COOLERS REMOVABLY ATTACHABLE TO GOLF CARTS

[76] Inventor: Edward C. Blount, 1520 Carlisle Dr. West, Mobile, Ala. 36618

[21] Appl. No.: 231,781

[22] Filed: Apr. 25, 1994

[51] Int. Cl.6 .................................................. B62B 1/04
[52] U.S. Cl. .................... 224/274; 224/42.44; 224/42.45 R; 224/42.46 R; 248/311.2; 280/304.5
[58] Field of Search ............... 224/274, 42.32, 42.33, 224/42.34, 42.35, 42.41, 42.44, 42.45 R, 42.46, 29, 174; 248/311.2, 98, 229; 280/DIG. 5, DIG. 6, 654, 655, 304.5, 47.26, 47.19

[56] References Cited

U.S. PATENT DOCUMENTS

| | | | |
|---|---|---|---|
| 2,883,134 | 4/1959 | O'Halloran | 248/311.2 |
| 2,926,879 | 3/1960 | Dietrich | 248/311.2 |
| 3,269,683 | 8/1966 | Shinaver | 248/311.2 |
| 4,657,100 | 4/1987 | Lewis | 224/274 |

Primary Examiner—Henry J. Recla
Assistant Examiner—Timothy L. Maust
Attorney, Agent, or Firm—Hugh E. Smith

[57] ABSTRACT

An interior C-shaped member formed of a rigid material and positionable in a horizontal orientation, the C-shaped member having parallel side edges and a coupling edge therebetween, apertures formed adjacent to the free ends of the parallel edges with a U-shaped tongue extending downwardly from the central extent of the coupling edge of the C-shaped member. A rectangular support member with parallel front and rear faces and parallel lateral faces and with apertures through the central extent of the lateral faces positionable in alignment with the apertures of the C-shaped member and adjustment nuts and bolts coupled therethrough. Two straps of a rigid material having parallel vertical edges extending downwardly from the central extent of the front and rear faces and the lateral faces of the support member with horizontal edges therebetween to thereby constitute a floor for the support of a cooler positioned through the top of the support member.

4 Claims, 4 Drawing Sheets

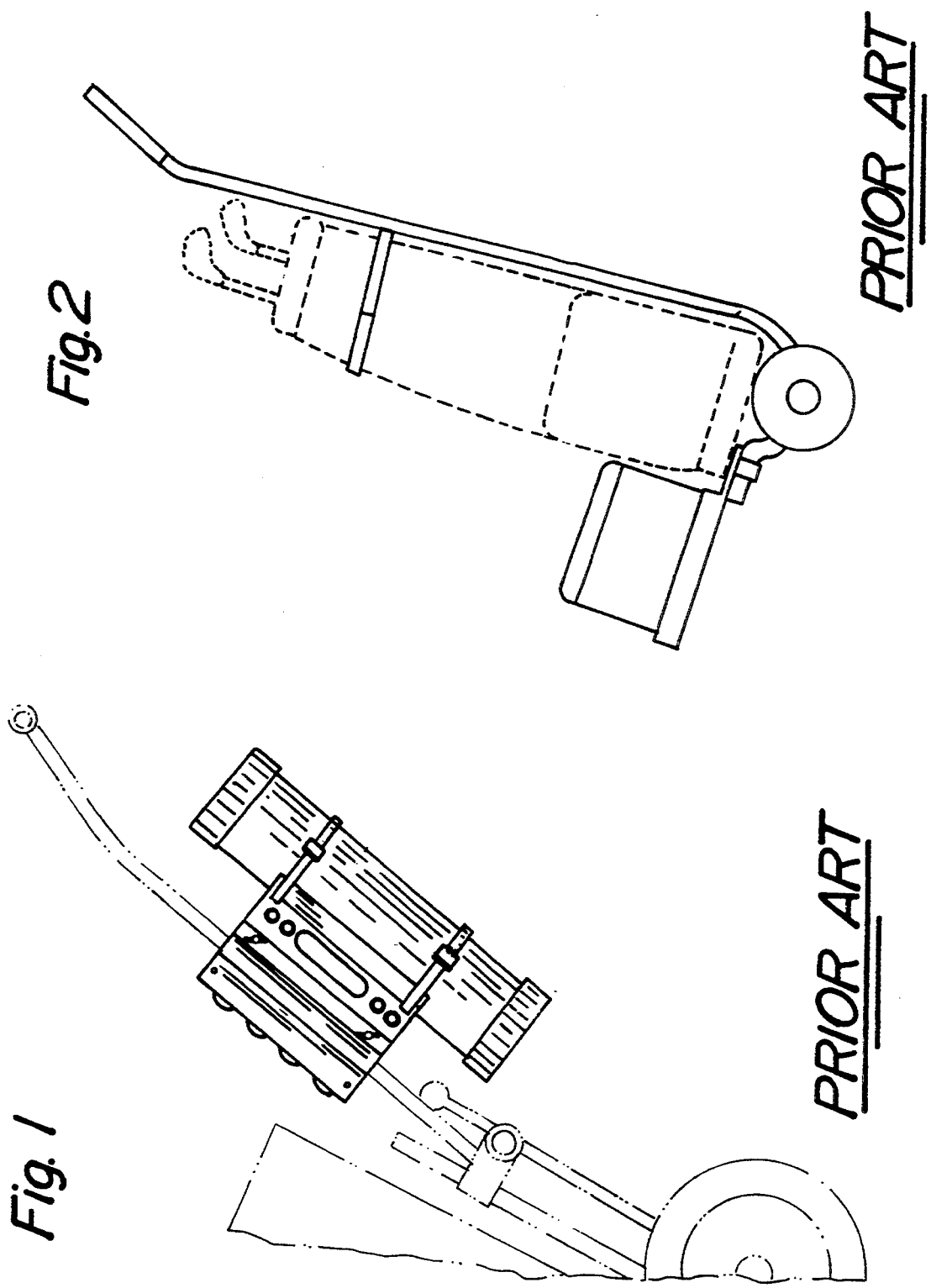

SUPPORT DEVICE FOR COOLERS REMOVABLY ATTACHABLE TO GOLF CARTS

BACKGROUND OF THE INVENTION

1. Field of the Invention

The present invention relates to a support device for coolers removably attachable to golf carts and more particularly pertains to removably attaching a device to a golf cart for the purpose of supporting and transporting a cooler.

2. Description of the Prior Art

The use of devices for attaching to golf carts and devices for supporting coolers is known in the prior art. More specifically, devices for attaching to golf carts and devices for supporting coolers heretofore devised and utilized for the purpose of supporting various devices on a golf cart are known to consist basically of familiar, expected, and obvious structural configurations, notwithstanding the myriad of designs encompassed by the crowded prior art which has been developed for the fulfillment of countless objectives and requirements.

By way of example, the prior art discloses in U.S. Pat. No. 5,193,842 to Fontenot discloses a combined golf bag and cooler cart.

U.S. Pat. No. 4,998,743 to Thielen discloses a golf cart.

U.S. Pat. No. 4,889,267 to Bolton discloses a cooler caddy for golf cart.

U.S. Pat. No. 3,844,459 to Chambers discloses a carrier accessory for beverages.

U.S. Pat. No. Des.310,593 to Lamarche the design of a carrier rack for housing a cooler when attached to a golf cart.

In this respect, the support device for coolers removably attachable to golf carts according to the present invention substantially departs from the conventional concepts and designs of the prior art, and in doing so provides an apparatus primarily developed for the purpose of removably attaching a device to a golf cart for the purpose of supporting and transporting a cooler.

Therefore, it can be appreciated that there exists a continuing need for new and improved support device for coolers removably attachable to golf carts which can be used for removably attaching a device to a golf cart for the purpose of supporting and transporting a cooler. In this regard, the present invention substantially fulfills this need.

SUMMARY OF THE INVENTION

In view of the foregoing disadvantages inherent in the known types of devices for attaching to golf carts and devices for supporting coolers now present in the prior art, the present invention provides an improved support device for coolers removably attachable to golf carts. As such, the general purpose of the present invention, which will be described subsequently in greater detail, is to provide a new and improved support device for coolers removably attachable to golf carts and method which has all the advantages of the prior art and none of the disadvantages.

To attain this, the present invention essentially comprises an interior C-shaped member formed of a rigid material and positionable in a horizontal orientation, the C-shaped member having parallel side edges and a coupling edge therebetween, apertures formed adjacent to the free ends of the parallel edges with a U-shaped tongue extending downwardly at an angle from the central extent of the coupling edge of the C-shaped member. A rectangular support member with parallel front and rear faces and parallel lateral faces and with apertures through the central extent of the lateral faces positionable in alignment with the apertures of the C-shaped member and adjustment nuts and bolts coupled therethrough for securement therebetween at a predetermined angle. Two straps of a rigid material having parallel vertical edges extending downwardly from the central extent of the front and rear faces and the lateral faces of the support member with horizontal edges therebetween to thereby constitute a floor for the support of a cooler positioned through the top of the support member. A holder tube of a rigid material with a rectangular cross section and apertures extending therethrough adapted to be mounted on the pull shaft of a golf cart at a predetermined elevational orientation, a bolt and nut positionable through the apertures of the holder tube to secure it at a predetermined orientation while allowing the space between the holder tube and the pull rod for the receipt of the downwardly extending U-shaped tongue whereby the device may be removably positioned with respect to a golf cart.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide new and improved support device for coolers removably attachable to golf carts which have all the advantages of the prior art devices for attaching to golf carts and devices for supporting coolers and none of the disadvantages.

It is another object of the present invention to provide new and improved support device for coolers removably attachable to golf carts which may be easily and efficiently manufactured and marketed.

It is further object of the present invention to provide new and improved support device for coolers removably attachable to golf carts which are of durable and reliable constructions.

An even further object of the present invention is to provide new and improved support device for coolers removably attachable to golf carts which are susceptible of a low cost of manufacture with regard to both materials and labor, and which accordingly are then susceptible of low prices of sale to the consuming public, thereby making such support device for coolers removably attachable to golf carts economically available to the buying public.

Still yet another object of the present invention is to provide new and improved support device for coolers removably attachable to golf carts which provide in the apparatuses and methods of the prior art some of the advantages thereof, while simultaneously overcoming some of the disadvantages normally associated therewith.

Still another object of the present invention is to removably attach a device to a golf cart for the purpose of supporting and transporting a cooler.

Lastly, it is an object of the present invention to provide new and improved interior C-shaped member formed of a rigid material and positionable in a horizontal orientation, the C-shaped member having parallel side edges and a coupling edge therebetween, apertures formed adjacent to the free ends of the parallel edges with a U-shaped tongue extending downwardly from the central extent of the coupling edge of the C-shaped member. A rectangular support member with parallel front and rear faces and parallel lateral faces and with apertures through the central extent of the lateral faces, positionable in alignment with the apertures of the C-shaped member and adjustment nuts and bolts coupled therethrough. Two straps of a rigid material having parallel vertical edges extending downwardly from the central extent of the front and rear faces and the lateral faces of the support member with horizontal edges therebetween to thereby constitute a floor for the support of a cooler positioned through the top of the support member.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side elevational view of a attachment device mounted on a golf cart.

FIG. 2 is another prior art device attachable to a golf cart.

The same reference numerals refer to the same parts through the various FIGURES.

DESCRIPTION OF THE PREFERRED EMBODIMENT

Figure 3:
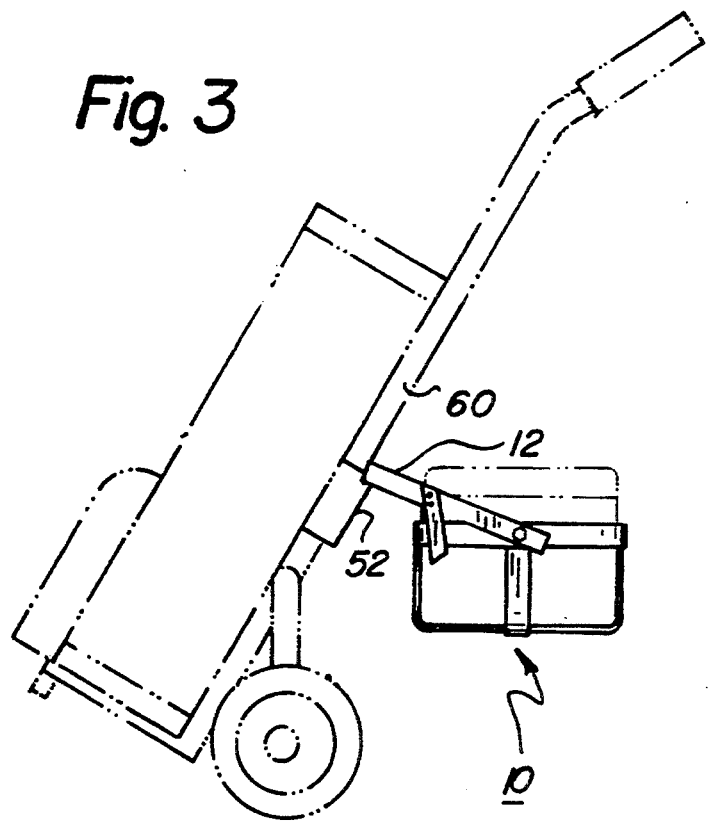
FIG. 3 is a front elevational view of the preferred embodiment of the new and improved support device for coolers removably attachable to golf carts constructed in accordance with the principles of the present invention.

With reference now to the drawings, and in particular to FIG. 1 thereof, the preferred embodiment of the new and improved support device for coolers removably attachable to golf carts embodying the principles and concepts of the present invention and generally designated by the reference numeral 10 will be described.

Specifically, the present invention, the new and improved support device for coolers removably attachable to golf carts is comprised of a plurality of components. Such components include a C-shaped member, a rectangular support member, straps and a holder tube. Such components are specifically configured and are correlated with respect to each other so as to obtain the desired objective.

More specifically, the system 10 includes an interior C-shaped member 12. Such member is formed of a rigid material and is positionable in a horizontal orientation. Such C-shaped member has parallel side edges 14 and a coupling edge 16 therebetween. Apertures 18 are formed adjacent to the free ends of the parallel edges with a U-shaped tongue 20 extending downwardly therefrom. Such tongue extends at an angle from the central extent of the coupling edge of the C-shaped member.

Next provided is a rectangular support member 24. Such support member has a parallel front face 26 and rear face 28. It also has parallel lateral faces 30 therebetween. Apertures 32 are formed through the central extent of the lateral faces. Such apertures are positionable in alignment with the apertures of the C-shaped member. Adjustment nuts 34 and associated bolts 36 are coupled through the aligned apertures for securement between the two members at any of a plurality of predetermined angles or to permit angular rotation of the support member, preferably to maintain the faces of the rectangular member in a horizontal orientation.

Figure 4:
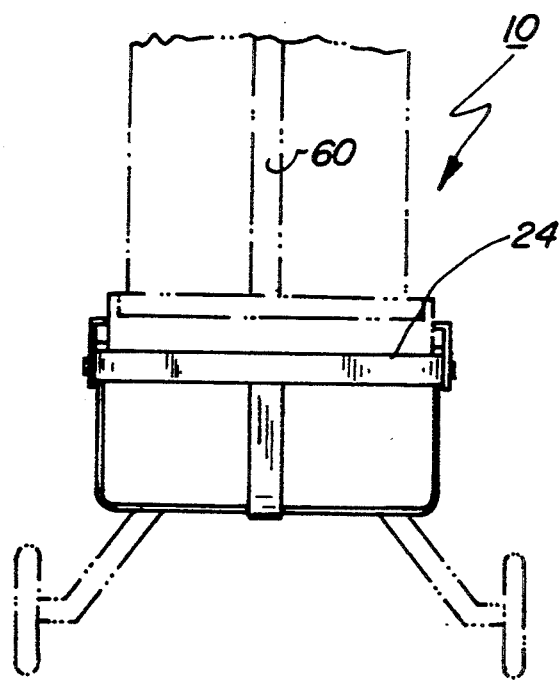
FIG. 4 is a front elevational view of the device illustrated in FIG. 3.
Figure 5:
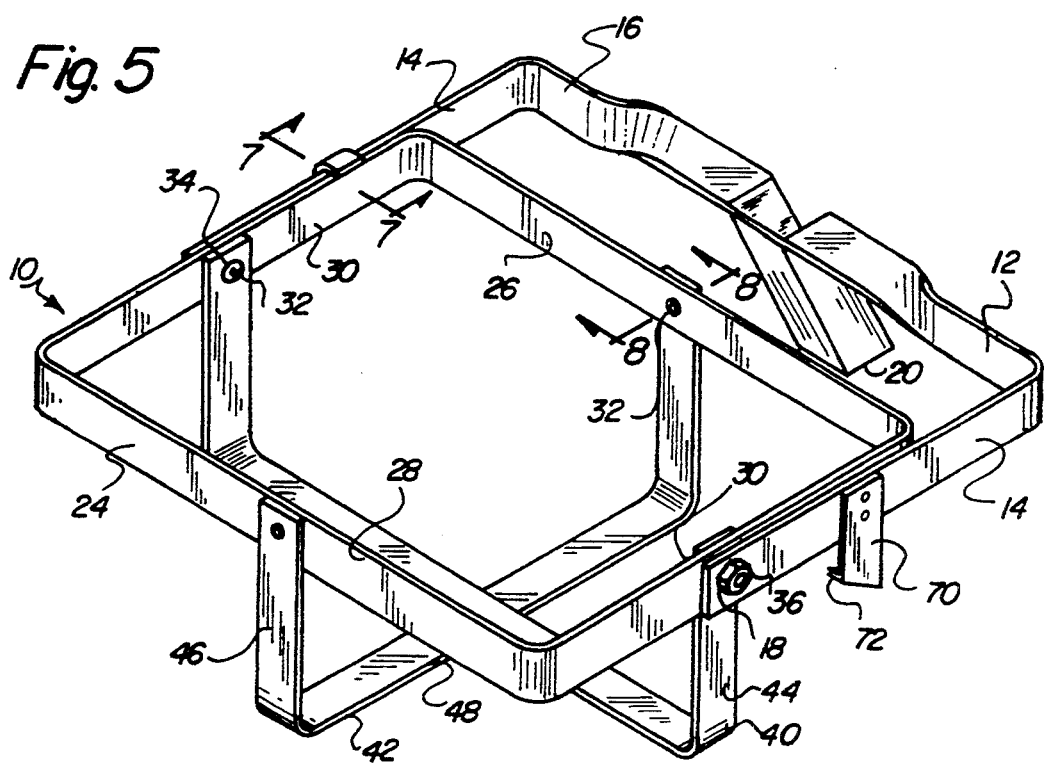
FIG. 5 is a perspective illustration of the device illustrated in FIGS. 3 and 4.
Figure 6:
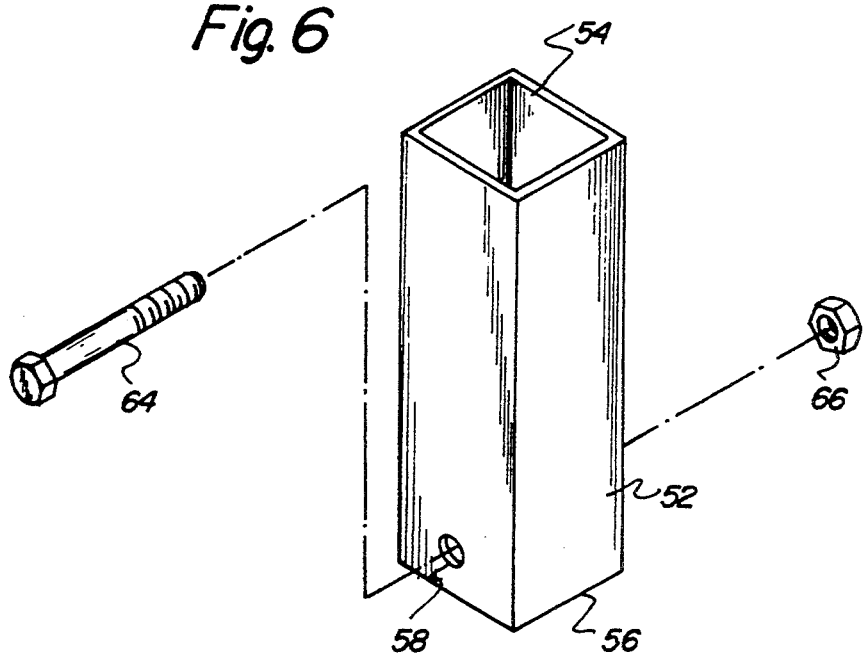
FIG. 6 is a perspective view of an adapter mechanism for use in association with the device of FIG. 5.
Figure 7:
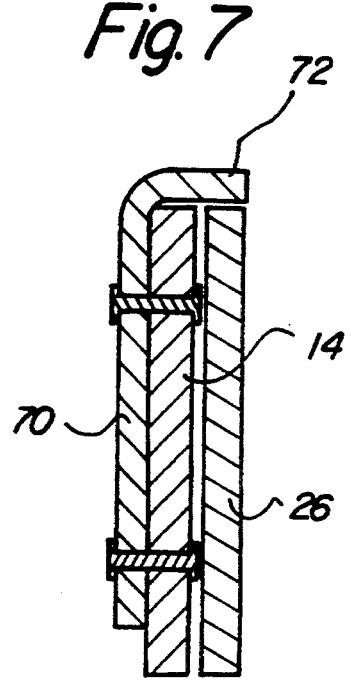
FIG. 7 is a cross sectional view taken along line 7—7 of FIG. 5.
Figure 8:
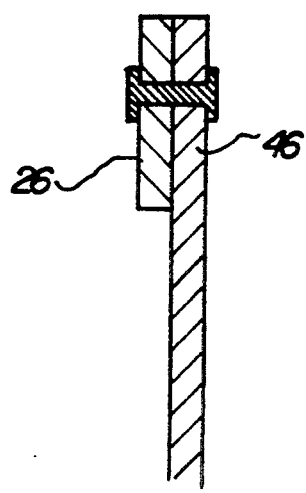
FIG. 8 is a cross sectional view taken along line 8—8 of FIG. 5.

Next provided are two straps 40 and 42. Such straps are in a generally U-shaped configuration and are fabricated of a rigid material. The straps have parallel vertical edges 44 and 46 extending downwardly from the central extents of the forward and rearward as well as the lateral faces of the support member. At the lower ends of the vertical edges are horizontal edges located between the vertical edges. Together, the straps constitute a floor 48 as well as side supports for supporting and retaining a cooler positioned through the rectangular top of the support member. Note FIGS. 3 and 4.

Next provided is a holder tube 52. The holder tube is of a rigid material with a rectangular cross section. It has an upper end 54 and a lower end 56. Apertures 58 extend through the front and rear faces of the tube. The tube is adapted to be mounted on the pull shaft 60 of a golf cart. Such positioning on the pull shaft is in any of a plurality of predetermined elevational orientations.

A bolt 64 and an associated nut 66 are positionable through the apertures of the holder tube. They also may pass through an aperture in the pull shaft to thereby secure the holder tube at the predetermined elevational orientation. By having the aperture of the tube at a lower orientation thereon, the upper component of the tube provides a space between the holder tube and the pull rod for the receipt of the downwardly extending U-shaped tongue. In this manner the device may be removably positioned with respect to a golf cart.

A last component of the system includes a pair of limiting members 70. The limiting members are secured to the parallel side edges of the C-shaped member at an intermediate orientation. The lower edges of such members extend inwardly to provide an abutment surface 72 to limit the angular rotation of the support member with respect to the C-shaped member.

The present invention is a basket which is attached to a pull cart whenever beverage coolers or other items are to be taken out on the golf course. It enables the players to enjoy the game more fully by allowing them to have food and drink available while they play a round of golf. The caddy is readily removable since there are times when it may not be needed. It can be put into place in only seconds because it has a U-shaped tongue which slides into a square tubular holder that is bolted to the post of the pull cart. The basket itself tilts freely so it is perfectly level at all times, regardless of the attitude of the cart itself. Unlike other apparatus which are adapted to a cart this invention offers a device which has been designed especially for this application and has all the features which are desired in such a unit. The present invention has a lightweight metal frame formed into a square, rectangle, or other shape to accommodate the items which are to be placed in them. This usually includes a specific cooler. Stops are provided on each side to prevent the basket from tilting too far forward or backward.

The present invention may be added to virtually any type of hand cart without any difficulty. It requires drilling a single hole into the post of the cart to permit fastening the holder to it using a single bolt and nut, and a spacer to mount it at an angle. All parts are corrosion resistant and can be easily plated, painted, or powder coated.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved support device for coolers removably attachable to golf carts having a pull shaft with an aperture therethrough comprising:

an interior C-shaped member formed of a rigid material and positionable in a horizontal orientation, the C-shaped member having parallel sides and a coupling side therebetween, apertures formed adjacent to free ends of the parallel sides with a U-shaped tongue extending downwardly at an angle from a central extent of the coupling side of the C-shaped member;

a rectangular support member with parallel front and rear faces and parallel lateral faces and with apertures through a central extent of each lateral face positionable in alignment with the apertures of the C-shaped member and adjustment nuts and bolts coupled therethrough for securement therebetween at a predetermined angle;

two straps of a rigid material each having parallel vertical sections connected to and extending downwardly, respectively, from a central extent of each front and rear face and each lateral face of the support member with horizontal sections therebetween to thereby constitute a floor for the support of a cooler positioned through the top of the support member; and a holder tube of a rigid material with a rectangular cross section and apertures extending therethrough adapted to be mounted around the pull shaft of a golf cart at a predetermined elevational orientation, a bolt and nut positionable through the apertures of the holder tube with the apertures of the holder tube in alignment with the aperture through the pull shaft and pull shaft to secure the holder tube at a predetermined orientation while allowing a space between the holder tube and the pull shaft for the receipt of the downwardly extending U-shaped tongue whereby the device may be removably positioned with respect to a golf cart.

2. A new and improved support device for coolers removably attachable to golf carts having a pull shaft comprising:

an interior C-shaped member formed of a rigid material and positionable in a horizontal orientation, the C-shaped member having parallel sides and a coupling side therebetween, apertures formed adjacent to free ends of the parallel sides with a U-shaped tongue extending downwardly from a central extent of the coupling side of the C-shaped member and adapted to be connected to said pull shaft;

a rectangular support member with parallel front and rear faces and parallel lateral faces and with apertures through a central extent of each lateral face positionable in alignment with the apertures of the C-shaped member and adjustment nuts and bolts coupled therethrough; and two straps of a rigid material each having parallel vertical sections connected to and extending downwardly, respectively, from a central extent of each front and rear face and the lateral face of each support member with horizontal edges therebetween to thereby constitute a floor for the support of a cooler positioned through the top of the support member.

3. The device as set forth in claim 2 and further including:

a holder tube of a rigid material with a rectangular cross section and apertures extending therethrough adapted to be mounted around the pull shaft of a golf cart at a predetermined elevational orientation with the apertures of the holder tube in alignment with the aperture through the pull shaft, a bolt and nut positionable through the apertures of the holder tube and pull shaft to secure the holder tube at a predetermined orientation while allowing a space between the holder tube and the pull shaft for the receipt of the downwardly extending U-shaped tongue whereby the device may be removably positioned with respect to a golf cart.

4. The device as set forth in claim 2 and further including:

abutment members to limit the angular rotation of the support member with respect to the C-shaped member.

* * * * *